Patented July 16, 1940

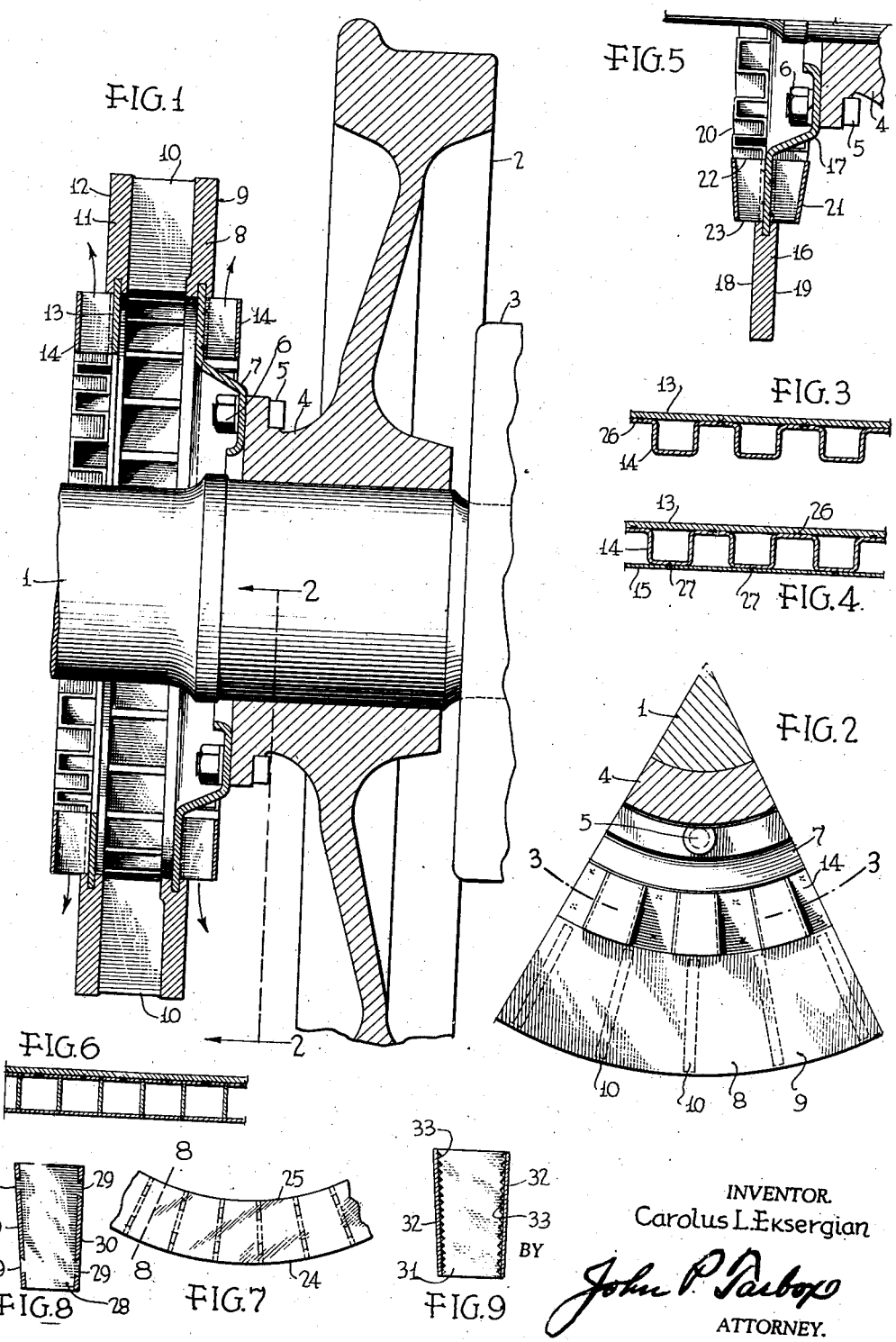

2,208,525

UNITED STATES PATENT OFFICE 2,208,525

BRAKE RING WITH COOLING MEANS

Carolus L. Eksergian, Detroit, Mich., assignor to Budd Wheel Company, Philadelphia, Pa., a corporation of Pennsylvania Application January 11, 1939, Serial No. 250,275

16 Claims. (Cl. 188—264)

The present invention relates to brakes, and particularly heavy duty brakes, such as are used for railway cars and other heavy vehicles.

More specifically, the invention relates to means for assisting in dissipating the heat produced by the brake when in action.

Still more specifically, the invention relates to means for producing air currents impinging against the friction member or members of the brake to carry off heat from the said brake.

The invention in one particular embodiment thereof comprises means, such as a blower of the centrifugal type, cooperatively connected with the brake element or elements so as to produce a strong substantially radial outward flow of air when the blower is rotated. This rotation is preferably secured by attaching the blower directly to the brake element itself or by attaching the blower to the axle of the vehicle, so as to rotate whenever the axle itself rotates, which particular form is selected, in any given instance, depending mainly upon considerations of convenience.

Several specific embodiments of the inventive concept are described in the present case, in one type of which substantially radial cooling vanes are interposed between two spaced brake rings and wherein auxiliary cooling means are also provided, and in another type of which a single brake ring is employed, with cooling means arranged preferably on both sides thereof.

For a clear understanding of the invention and the underlying principles upon which its action depends, attention is directed to the present specification and the accompanying drawing, wherein:

Fig. 1 is an axial sectional view of a vehicle wheel having a pair of brake rings secured thereto, a portion of the axle and journal box being shown also, in elevation, Fig. 2 is a partial section through the structure disclosed in Fig. 1, the section being made on the plane indicated by the line 2—2 thereof and looking in the direction indicated by the arrows, Fig. 3 is a developed fragmentary circumferential section through the auxiliary cooling vanes of Fig. 2, on the cylindrical-arcuate surface indicated by the line 3—3 of Fig. 2, Fig. 4 is a corresponding fragmentary section showing an alternative form of cooling vanes, similar to the Fig. 3 type.

Fig. 5 is a partial axial section through a modified form of brake wherein a single brake ring is used, with cooling means for acting on both sides thereof, a fragment of the axle being shown in elevation, Fig. 6 is a developed fragmentary circumferential section through a modified form of the cooling structure shown in Figs. 3, 4, and 5, Fig. 7 is a fragmentary elevation of another modified form of the auxiliary cooling vanes of Figures 3, 4, and 5, Fig. 8 is a section thereof on the plane indicated by the line 8—8 of Fig. 7, showing the means for securing the cooling vanes to the end flanges, and Fig. 9 illustrates a still further way of holding the vanes to the flanges, wherein projection welding is used to secure the vanes in place.

Referring first to Fig. 1, the wheel 2 is shown with its hub 4 mounted upon an axle 1, which is journalled in the bearing 3.

The brake structure here is supported from this hub and comprises a flange 7 secured to the hub, as by a number of bolts 5 and nuts 6, or in any other suitable or conventional manner, although it must be understood clearly that the brake may equally well be secured directly to the axle 1 by means entirely independent of the axle 1 by means entirely independent of the wheels, if preferred for any reason. Where the wheel is loose or "free" on the axle the brake will of course be secured to the wheel, or wheel hub.

The flange 7 may be secured to the brake ring 8 in any desired way, preferably by placing the 8 in the mold and casting the ring 8 upon flange 7 in the mold and casting the ring 8 upon it. A similar ring 11 placed parallel to the ring 8, and properly spaced therefrom, is secured to said ring 8 by means of a suitable series of vanes 10, each placed substantially radially, as clearly shown in Figures 1 and 2. The ring 11 carries a flange 13 which extends radially inward therefrom, this flange also preferably being secured to the said ring by casting, and in the sa.ne way the vanes 10 may be united with the two rings 8 and 11, said rings consisting either of cast metal, for instance iron, integral with the rings 8 and 11, formed in a single casting operation, or of individual flat pieces, say of sheet metal or cast metal, secured to the two rings by the casting operation, that is by initially placing the pre-cut or pre-cast vanes in the mold. However, these details do not constitute an important feature of the invention and may be modified as preferred in each particular instance, depending mainly upon considerations of convenience, and ease and cheapness of manufacture.

The auxiliary cooling means consists of a series of substantially radially directed channel members which may be formed of sheet metal such as iron or other suitable material and which may comprise a series of immediately contiguous closed channels, as indicated in Fig. 4 or a series of alternately-placed closed and open channels, as shown in Fig. 3. The form specifically illustrated in Figs. 1, 2 and 3 is that wherein the alternate channels are open and closed respectively and this form will be described first.

To the annular flange 13 of Fig. 1 there is secured a strip of metal 14 having tapered corrugations of substantially rectangular cross section formed therein, the strip being fastened to the flange by welding or riveting, etc., spot welding 26 being preferred for cheapness and simplicity and being the form specifically illustrated. It will be understood that preferably a similar strip of corrugated metal is secured also to the inner radially extending portion of the flange 7, opposite and parallel to the flange 13, so that the finished structure of Fig. 1 thus has two sets of auxiliary vanes attached thereto, one on each outer face thereof, and radially within the respective rings 8 and 11.

The form wherein all the auxiliary air channels are enclosed is illustrated in Fig. 4 and this form is obtained by merely adding an extra piece of metal, such as 15, which is ring-shaped and which may be secured to the corrugations as clearly shown at 27, in Fig. 4, preferably also by spot welding. The form shown in Fig. 4 probably has an increased cooling effect because it leads more cooling air into the desired radially outward paths, as will be described hereinafter.

It will be understood that in operation suitable brake shoes will bear against the friction surfaces 9 and 12 of the brake rings 8 and 11, and that the brake shoes preferably will extend through only a portion of the circumference of each brake ring so that usually two-thirds or more of the brake ring will not be in contact with or covered by any obstruction, whereby a suitable amount of free surface for air cooling may be attained. This is disclosed in copending application Serial No. 198,398, to which reference should be had for further details.

Referring now to the form shown in Fig. 5, the axle 1 carrying the wheel hub 4 serves also to support a single brake ring 16 which is here shown secured to the hub 4 by means of bolts 5 passing through the flange 17, which is secured to the hub by the nuts 6. The brake ring 16 may be secured to the flange 17 in any suitable manner, as by casting the ring 16 thereon, so as to form an integral structure therewith. The ring 16 has two opposite friction surfaces 18 and 19 which will cooperate with the respective brake shoes, just as in the Fig. 1 form.

Since in this embodiment only a single ring 16 is employed in place of the two spaced rings shown in Fig. 1, there is, of course, no opportunity to provide cooling within the body of the ring itself and, therefore, the entire vane structure in this embodiment is placed radially within the brake ring. This cooling structure comprises vanes arranged preferably on both sides of the flange 17, as indicated at 20 and 21. The vanes here shown are of the same general type as the auxiliary vanes illustrated in Figs. 1, 2 and 3, that is, they consist of the alternate open and closed passages produced by the corrugated strip. However, while in Fig. 1 the passages produced between the auxiliary vanes are defined by parallel and substantially radial planes, in Fig. 5 on the contrary the limiting surfaces are somewhat conical in nature, that is, the passages taper in a radial direction, as is seen on comparing the length of the inner edge 22 of one of the vanes with the length of its outer edge 23. Nevertheless, the cross sectional or air-flow area of each passage is thereby maintained substantially uniform throughout the entire length of each channel, because the circumferential length of each vane at its outer end, for example 24, in Fig. 7, is greater than the corresponding circumferential length at its inner end 25, and preferably the slant of the conical surface will be suitably chosen so as to maintain this substantial uniformity of flow area for the air in the channels. This avoids disturbance of the air flow.

The auxiliary vanes may also be secured to the flange in other ways, for example, as clearly shown in Figs. 7 and 8, the vanes 28 may have tongues or lugs 29 extending from their side edges and clinched through the flanges 30. In this way the vanes are secured by what may be considered as clinching or riveting instead of by spot welding or the like.

Fig. 9 illustrates a still different way of securing the vanes 31 between the rings 32, namely, by projection welding, as indicated at the lines of contact 33 between the vanes and the flanges.

In operation, it will be understood that when suitable brake shoes are applied against the surfaces 9 and 12 of Fig. 1, heat will be produced by the braking energy and this heat, if not dissipated, will, of course, raise the temperature of the rings 8 and 11. In order to avoid any injurious deterioration or "fading" effect upon the brake shoes due mainly to excessive temperatures, much of this heat may be carried off by the vanes 10, which being radially placed, in effect constitute a centrifugal blower of the Sirocco type. The powerful air currents produced in a radially outward direction between the vanes will, of course, cool the vanes and at the same time these air currents also impinge against the inner surfaces of the rings 8 and 11, so that some of the heat is dissipated from the rings 8 and 11 directly by the radial air currents and other heat is dissipated by first being conducted into the vanes 10 and then carried off therefrom by the air currents flowing past said vanes.

In order still further to increase the cooling effect, use is made of the air currents produced by the auxiliary vanes, which are placed radially within the brake rings and which provide an entirely independent source of air currents having a radially outward direction of flow. It will be noticed that the air currents produced by the auxiliary vanes impinge directly against the effective friction surfaces 9 and 12 of the rings 8 and 11 so that they produce a direct cooling effect on said rings.

It must be remembered that the heat produced at the friction surfaces 9 and 12 must first flow through the metal of the rings 8 and 11 before the inner vanes 10 or the internal air currents produced by such vanes can have any cooling effect upon the surfaces 9 and 12 and that in some instances, where intense braking is applied for a relatively short time, the surfaces 9 and 12 might become unduly heated before the heat energy could flow to the inside channels. This excessive temperature might possibly injure the brake shoes and cause their fading, and thus result in gradual or rapid deterioration thereof, depending upon the nature and material of the brake shoes.

However, the auxiliary air currents produced by the outer sets of vanes impinge directly on the friction surfaces 9 and 12 and thus have an instantaneous cooling effect, since the heat need not first travel through the metal of the rings 8 and 11 before it can be dissipated. This is a decided advantage, particularly where intense braking of short duration is mainly involved. This does not mean that this is the only helpful effect of the auxiliary vanes, for obviously the currents of air produced by such vanes always will cooperate with the internal air currents produced by the vanes 10, thus resulting in a greater cooling effect than either set of vanes would give in and of itself.

In fact in the single ring brake of the Fig. 5 type the entire cooling effect is that produced solely by the auxiliary vanes, since there are no internal vanes in this type. Nevertheless, adequate cooling effect may be secured in this way by the air currents which impinge directly against both friction surfaces of the ring 16.

It will also be obvious that a somewhat better cooling effect may be attained by using the all-closed channel type of Fig. 4 than by using the alternate closed and open channel type shown, for example, in Figs. 1, 2 and 3. This is for the reason that in the Fig. 4 type the air is positively forced to flow radially in all the channels whereby an increased air flow is obtained. This form is somewhat heavier and also has an added expense, however, due to its greater complication and, therefore, ordinarily it will be used only where such additional cooling effect is sufficiently desirable to make it worth the extra cost.

In the Fig. 5 form the cooling effect is assisted somewhat by the conduction of heat occurring between the body of the ring 16 and the internal flange 17, which forms one boundary of each of the air channels. This additional cooling effect however is not immediately available since it comes into action only after the body 16 has transmitted heat to the flange 17 by conduction, that is, it acts much in the same way as do the flanges 10 of Fig. 1, in respect of delayed cooling. When the brake is continuously in action however, as in descending a long grade, this added cooling effect also becomes of importance for in this condition a state of equilibrium will of course become established and heat will be dissipated by conduction through the metal as well as by the convection cooling produced by the air currents themselves directly at the friction surfaces. A somewhat similar effect occurs also in the Fig. 1 form, through the flanges 7 and 13 thereof, but is not of as great importance in that form, because the vanes 10 already produce the conduction-convection cooling effect in this form much better than could the flanges 7 and 13.

While probably the principal field of usefulness of the present invention will be for heavy duty brakes, this does not mean that it may not also be applied to brakes of all kinds, for example, even on relatively light automobiles. Therefore, nothing in the present specification is to be considered as limiting the brakes to any specific field of use.

For a clear understanding of the scope of the present invention attention is directed to the following claims.

I claim:

1. A rotary brake ring, means for attaching it to the rotatable element which is to be braked thereby, said brake ring having an annular radial friction surface at one end and means for producing air currents, said means being located radially within the brake ring and producing an air flow which has a radially outward direction, and which impinges directly upon the said friction surface, the major portion of said friction surface being exposed to said air flow at all times during the rotation of said ring.

2. A rotary brake ring, means for attaching it to the rotatable element which is to be braked thereby, said brake ring having an annular radial friction surface at one end, and means actuated by the rotatable element, for producing air currents, said means being located radially within the brake ring and producing an air flow which has a radially outward direction, and which impinges directly upon the said friction surface, the major portion of said friction surface being exposed to said air flow at all times during the rotation of said ring.

3. A rotary brake ring, means for attaching it to the rotatable element which is to be braked thereby, said brake ring having an annular radial friction surface at one end, and a centrifugal blower, for producing air currents, said blower being located radially within the brake ring and producing an air flow which has a radially outward direction, and which impinges directly upon the said friction surface, the major portion of said friction surface being exposed to said air flow at all times during the rotation of said ring.

4. A rotary brake ring, means for attaching it to the rotatable element which is to be braked thereby, said brake ring having an annular radial friction surface at one end and a plurality of vanes, for producing air currents when rotated, said vanes being substantially radially arranged and located radially within the brake ring to produce an air flow which has a radially outward direction, and which impinges directly upon the said friction surface, the major portion of said friction surface being exposed to said air flow at all times during the rotation of said ring.

5. A rotary brake ring, means for attaching it to the rotatable element which is to be braked thereby, said brake ring having an annular radial friction surface, at one end, a plurality of vanes, for producing air currents when rotated, and means whereby the rotatable element rotates the vanes, said vanes being substantially radially arranged and located within the brake ring to produce an air flow which has a radially outward direction, and which impinges directly upon the said friction surface, the major portion of said friction surface being exposed to said air flow at all times during the rotation of said ring.

6. A rotary brake ring, means for attaching it to the rotatable element which is to be braked thereby, said brake ring having annular radial friction surfaces at its ends, and means for producing air currents, said means being located radially within the brake ring and producing air flow which has a radially outward direction, and which impinges directly upon the said friction surfaces, the major portions of said friction surfaces being exposed to said air flows at all times during the rotation of said ring.

7. A rotary brake ring, means for attaching it to the rotatable element which is to be braked thereby, said brake ring having annular radial friction surfaces at its ends, and means actuated by the rotatable element, for producing air currents, said means being located radially within the brake ring and producing air flow which has a radially outward direction, and which impinges directly upon both the said friction surfaces, the major portions of said friction surfaces being exposed to said air flows at all times during the rotation of said ring.

8. A rotary brake ring, means for attaching it to the rotatable element which is to be braked thereby, said brake ring having annular radial friction surfaces at its ends, and two centrifugal blowers, for producing air currents, said blowers being located radially within the brake ring and producing air flows which have a radially outward direction, and which impinge directly upon the said respective friction surfaces, the major portions of said friction surfaces being exposed to said air flows at all times during the rotation of said ring.

9. A rotary brake ring, means for attaching it to the rotatable element which is to be braked thereby, said brake ring having annular radial friction surfaces at its ends, and a plurality of vanes, for producing air currents when rotated, said vanes being substantially radially arranged and located radially within the brake ring to produce air flows which have a radially outward direction, and which impinge directly upon the said respective friction surfaces, the major portions of said friction surfaces being exposed to said air flows at all times during the rotation of said ring.

10. A rotary brake ring, means for attaching it to the rotatable element which is to be braked thereby, said brake ring having annular radial friction surfaces at its ends, a plurality of sets of vanes, for producing air currents when rotated, and means whereby the rotatable element rotates the said vanes, said vanes being substantially radially arranged and located radially within the brake ring to produce air flows which has a radially outward direction, and which impinge directly upon the said respective friction surfaces, the major portions of said friction surfaces being exposed to said air flows at all times during the rotation of said ring.

11. A rotary brake ring, means for attaching it to the rotatable element which is to be braked thereby, said brake ring having an annular radial friction surface at its end, a substantially annular member having a plurality of substantially radially directed air channels therein, for producing air currents when rotated, said member being adjacent the brake ring and of smaller diameter than said ring and means whereby the rotatable element rotates the said member, to produce an air flow which has a radially outward direction, and which impinges directly upon the said friction surface.

12. A rotary brake ring, means for attaching it to the rotatable element which is to be braked thereby, said brake ring having an annular friction surface at its end, a substantially annular member made of sheet material bent back and forth to form a plurality of substantially radially directed air channels, for producing air currents when rotated, said member being adjacent the brake ring and of smaller diameter than said ring and means whereby the rotatable element rotates the said member, to produce an air flow which has a radially outward direction, and which impinges directly upon the said friction surface.

13. A rotary duplex brake ring, means for attaching it to the rotatable element which is to be braked thereby, said duplex brake ring comprising two spaced-apart rings each having an annular radial friction surface at its outer end, and means for producing air currents, said means being located radially within the duplex brake ring and comprising separate members for producing air flow which has a radially outward direction, and which impinges directly upon both said friction surfaces, the major portions of said friction surfaces being exposed to said air flows at all times during the rotation of said ring.

14. A rotary duplex brake ring, means for attaching it to the rotatable element which is to be braked thereby, said duplex brake ring comprising two spaced-apart rings each having an annular friction surface at its outer end, and means for producing air currents, said means being located within the duplex brake ring and comprising separate members each made of sheet material bent back and forth to provide substantially radially directly air channels for producing air flows which have a radially outward direction, and which impinge directly upon said respective surfaces.

15. A rotary brake ring, means for attaching it to a rotatable element which is to be braked thereby, said ring having an annular radial friction surface at one end and generally radial vanes extending from the surface opposite said friction surface, and auxiliary generally radial vanes located radially within the brake ring, said last-named vanes producing air currents when the ring is rotated impinging directly upon said friction surface, the major portion of said friction surface being exposed to said air currents at all times during rotation of said ring.

16. A rotary duplex brake ring, means for attaching it to a rotatable element which is to be braked thereby, said duplex ring comprising two spaced rings, each having an annular radial friction surface at its outer end and means for producing air currents across the inside and outside surfaces of said rings, said means comprising generally radially extending vanes bridging the space between the spaced apart rings and auxiliary vanes located radially inwardly of said rings for producing air flow which has radial outward direction and which directly impinges upon both said outer friction surfaces.

CAROLUS L. EKSERGIAN.